No. 746,903. PATENTED DEC. 15, 1903.
J. W. H. UYTENBOGAART.
ELECTRIC RECEIVER CLOCK.
APPLICATION FILED MAY 6, 1903.

NO MODEL. 2 SHEETS—SHEET 1.

Witnesses:—

Inventor:—
Johannes Wilhelmus Huybert
Uytenbogaart
by Eustace W. Hopkins
Atty.

No. 746,903. PATENTED DEC. 15, 1903.
J. W. H. UYTENBOGAART.
ELECTRIC RECEIVER CLOCK.
APPLICATION FILED MAY 6, 1903.
NO MODEL. 2 SHEETS—SHEET 2.

Witnesses:—

Inventor:—
Johannes Wilhelmus Hemybert Uytenbogaart
by Eustace W. Hopkins
Atty.

No. 746,903. Patented December 15, 1903.

UNITED STATES PATENT OFFICE.

JOHANNES WILHELMUS HUYBERTS UYTENBOGAART, OF UTRECHT, NETHERLANDS.

ELECTRIC RECEIVER-CLOCK.

SPECIFICATION forming part of Letters Patent No. 746,903, dated December 15, 1903.

Application filed May 6, 1903. Serial No. 155,884. (No model.)

*To all whom it may concern:*

Be it known that I, JOHANNES WILHELMUS HUYBERTS UYTENBOGAART, a subject of the Queen of the Netherlands, residing at Utrecht, Netherlands, have invented certain new and useful Improvements in Electric Receiver-Clocks, of which the following is a description.

The present invention relates to electric driving mechanism, and more especially to that class of mechanism which derives its power from a main source by means of current impulses producing alternating polarity. The mechanism is employed for producing intermittent motion, as in the case of electric clocks, and the parts are so constructed and arranged that the permanent magnets are kept closed while the mechanism is stationary, and consequently are continually being regenerated by the electromagnets during this period instead of gradually losing their magnetism, as is the case if they are not closed.

The invention is described in connection with an electric clock; but it may also be used for other purposes.

In order to render the present specification easily intelligible, reference is had to the accompanying drawings, in which similar letters of reference denote similar parts throughout the several views.

Figure 1:
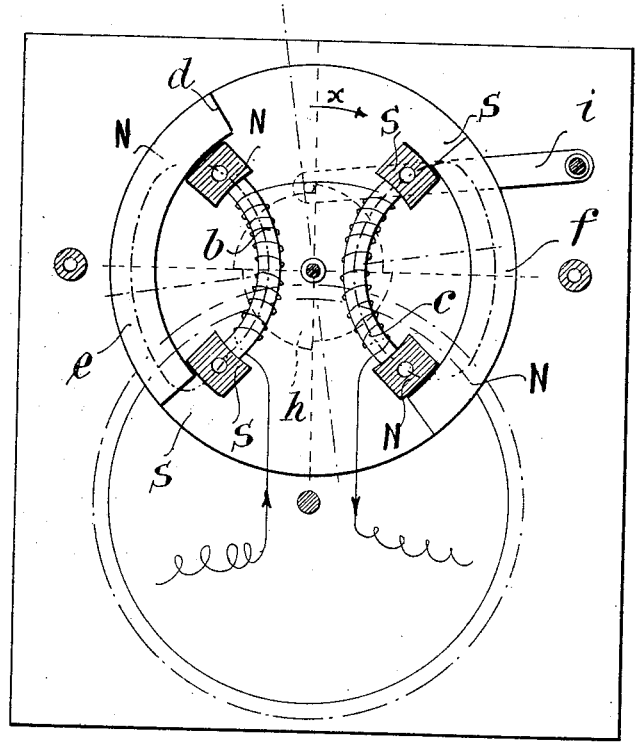
Figure 2:
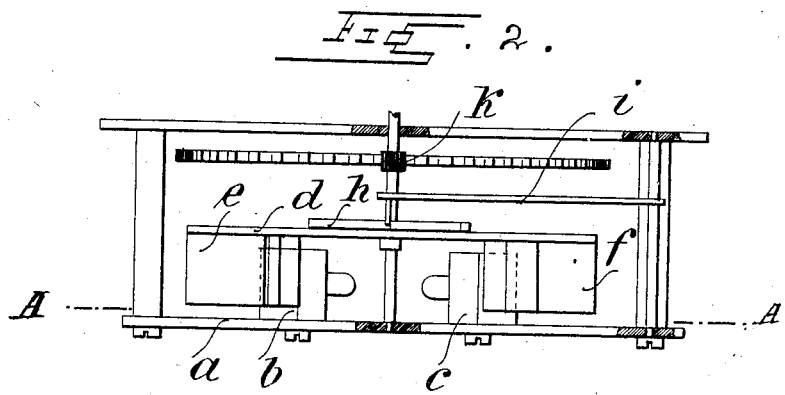

Figure 1 is a sectional face view of the clock, taken on line A A of Fig. 2. Fig. 2 is a horizontal section taken along the center line of the rotating disk; and Figs. 3 and 4 are sectional face views of a modified form of the invention, showing the magnets in two different positions.

Referring first to Figs. 1 and 2, the two electromagnets $b$ and $c$ are mounted on the stationary plate $a$, and the windings of these magnets are arranged so that the current impulses coming from the main clock will excite the same to form poles of alternating polarity in a circle, as will be seen from Fig. 1. The permanent magnets $e$ and $f$ are mounted on a rotary or driven disk $d$, the poles of these magnets being also arranged alternatingly in a circle.

Figure 3:
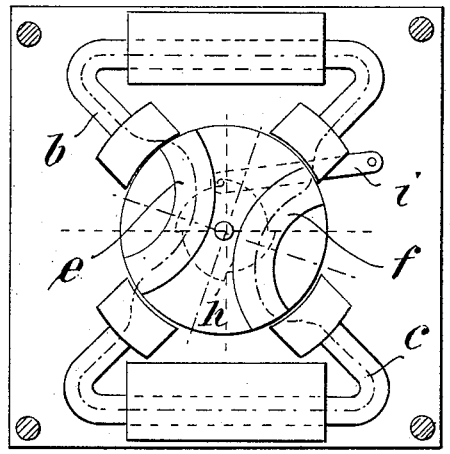
Figure 4:
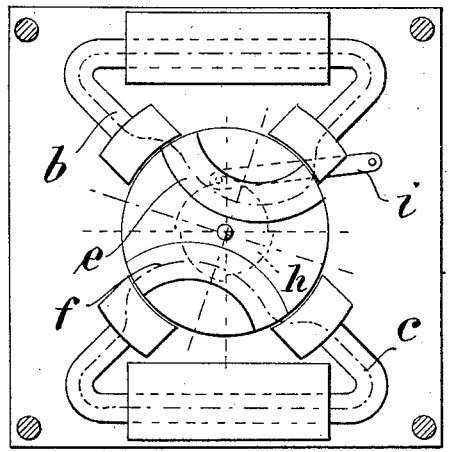

In the device illustrated in Figs. 1 and 2 the permanent magnets are mounted outside the electromagnets, while in Figs. 3 and 4 the arrangement is reversed, the electromagnets being outside the permanent magnets. The electromagnets are adjusted in both cases so that the poles formed on the passage of the current will be of similar polarity to that of the poles of the permanent magnets lying opposite to them, so that on each current impulse repelling force will be generated. The disk $d$ is provided with a ratchet-wheel $h$, controlled by a pivotally-supported pawl $i$, and this wheel is adjusted on the disk so that the points forming the actual poles will not lie radially opposite to each other, but are slightly displaced, so that the repelling force will result in a tangential component acting in the direction of rotation of the disk $d$ and adapted to turn the same a quarter of a turn. Thus, as illustrated in Fig. 1, on an impulse being imparted to the electromagnets the poles S S of each pair of magnets will repel each other and cause the disk $d$ to rotate in the direction of the arrow $x$, Fig. 1, and when a slight movement of the disk has taken place the poles S of the electromagnets will attract the poles N of the permanent magnets, thus assisting the rotative power. In intermittent rotation the impulse will now cease; but the impetus of rotation will cause the rotary parts to go slightly farther than the quarter of a turn intended, and the pawl $i$ and ratchet-wheel are timed to coact, so as to arrest the rotary member in a position corresponding to the position of the parts originally determined, but a quarter of a revolution farther on. The next impulse will reverse the poles of the electromagnets, so that again similar poles of these magnets will be in proximity to the same poles of the permanent magnets, and owing to the lead of two of the poles of these pairs of magnets the impulse will produce a further rotation of a quarter of a turn, and so on.

Obviously if the impulses are sufficiently quick continual rotation of the disk will result, and a reversal of rotation would be easily attained by slightly moving the electromagnets so as to shift the lead, as will be readily understood.

The path of the lines of power is illustrated in Figs. 1, 2, and 4 in a dot-and-dash line, and it will be seen from these figures that the permanent magnets are kept constantly closed by the electromagnets in whatever position the former happen to be.

The rotating disk $d$ transmits its motion in the known manner by means of the pinion $k$ to the clockwork.

The mechanism described is not only suited for currents of low density, but may be easily adapted for currents of high density.

I claim as my invention—

1. In an electric driving mechanism of the class specified comprising movable permanent magnets and stationary electromagnets, means for retaining the permanent magnets closed while they are not moving, substantially as described.

2. In an electric driving mechanism of the class specified, the combination of movable permanent magnets and stationary electromagnets, both sets being arranged in concentric circles and means for retaining the permanent magnets closed by the electromagnets when the former are not moving substantially as described.

3. In an electric driving mechanism of the class specified, the combination of movable permanent magnets and stationary electromagnets, means for retaining the permanent magnets closed when not moving and means for imparting tangential movement to the said movable magnets when they are repelled by the energizing of the electromagnets substantially as described.

4. In an electric driving mechanism of the class specified, the combination of a set of movable permanent magnets arranged in a circle and having their poles alternating in polarity, a set of stationary electromagnets arranged in a concentric circle and also having their poles alternating in polarity, and means for retaining the said permanent magnets closed by the electromagnets between the movements of the former substantially as described.

5. In an electric driving mechanism of the class specified, the combination of a set of movable permanent magnets arranged in a circle and having their poles alternating in polarity, a set of stationary electromagnets arranged in a concentric circle, means for arresting the movable magnets after each impulse, means for imparting similar polarity to each member of the pairs of opposing poles of the movable and stationary sets, means for retaining the permanent magnets closed after each impulse and means for imparting tangential movement to the movable magnets on each impulse substantially as described.

In witness whereof I have hereunto set my hand in presence of two witnesses.

JOHANNES WILHELMUS
HUYBERTS UYTENBOGAART.

Witnesses:
AUGUST SIEGFRIED DOCEN,
PAUL STAAL.